(12) United States Patent
Andrijic et al.

(10) Patent No.: US 12,519,761 B2
(45) Date of Patent: Jan. 6, 2026

(54) MONITORING AND VISIBILITY OF DATA TRAFFIC FLOWS

(71) Applicant: Cisco Technology, Inc., San Jose, CA (US)

(72) Inventors: Ana Andrijic, Raleigh, NC (US); Srilatha Vemula, Apex, NC (US); David C. White, Durham, NC (US); Arati Shimikeri, Union City, CA (US); Poorna Rajaraman, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 17/896,066

(22) Filed: Aug. 25, 2022

(65) Prior Publication Data

US 2024/0073192 A1    Feb. 29, 2024

(51) Int. Cl.
*H04L 9/40* (2022.01)
*H04L 45/00* (2022.01)

(52) U.S. Cl.
CPC .......... *H04L 63/0435* (2013.01); *H04L 45/38* (2013.01); *H04L 63/107* (2013.01); *H04L 63/20* (2013.01)

(58) Field of Classification Search
CPC ..... H04L 9/321; H04L 41/0645; H04L 45/70; H04L 63/0236; H04L 63/1433; H04L 67/1012; H04L 12/4641; H04L 63/20; H04L 63/0421; H04L 63/1416; H04L 45/851; H04L 63/105; G06F 3/067; G06F 11/3684; G06F 21/6218; H04M 3/5183; H04N 20/00; H04N 21/552; H04N 21/6245; H04N 21/6263; H04W 24/08
See application file for complete search history.

(56) References Cited

U.S. PATENT DOCUMENTS

| | | | |
|---|---|---|---|
| 7,142,536 B1 * | 11/2006 | Gossett | H04L 45/851 370/363 |
| 8,817,614 B1 * | 8/2014 | Ben-Nun | H04W 24/08 370/428 |
| 9,015,802 B1 | 4/2015 | Muthusrinivasan | |
| 9,661,011 B1 * | 5/2017 | Van Horenbeeck | H04L 45/70 |
| 9,712,381 B1 * | 7/2017 | Emanuel | H04L 41/0645 |
| 9,881,178 B1 * | 1/2018 | Brown | H04M 3/5183 |
| 11,539,817 B1 * | 12/2022 | Perez | H04L 67/1012 |
| 2012/0204260 A1 * | 8/2012 | Cecil | H04L 63/20 726/22 |
| 2017/0033739 A1 | 2/2017 | Djahanshahi et al. | |
| 2018/0013570 A1 * | 1/2018 | Knopf | H04L 9/321 |
| 2018/0309775 A1 * | 10/2018 | Zou | H04L 63/1416 |

(Continued)

*Primary Examiner* — Dustin Nguyen
(74) *Attorney, Agent, or Firm* — Lee & Hayes, P.C.

(57) ABSTRACT

This disclosure describes techniques for data path monitoring and visibility in communications among network devices. The techniques include determining that personally identifiable information (PII) is included in a data traffic flow intended for delivery to a destination endpoint. A probe may be sent from a source endpoint to identify an intended data path of the data traffic flow to the destination endpoint. The techniques include validating the intended data path of the data traffic flow against a policy related to data routing. Based at least in part on a result of the validation, the techniques may include allowing or dropping the data traffic flow, or various other actions.

20 Claims, 10 Drawing Sheets

(56) References Cited

U.S. PATENT DOCUMENTS

| | | | |
|---|---|---|---|
| 2019/0003480 A1 | 1/2019 | Palanichamy | |
| 2019/0182157 A1* | 6/2019 | Barnes | G06F 21/6218 |
| 2020/0003447 A1 | 1/2020 | Grant | |
| 2020/0026877 A1 | 1/2020 | Dattatri | |
| 2020/0175195 A1* | 6/2020 | Nomura | G06F 21/6245 |
| 2020/0389494 A1* | 12/2020 | Coffing | H04L 63/105 |
| 2020/0412699 A1* | 12/2020 | Lapushkin | H04L 63/0421 |
| 2021/0026986 A1* | 1/2021 | Woessner | G06F 21/6263 |
| 2021/0234889 A1* | 7/2021 | Burle | H04L 63/1433 |
| 2022/0035730 A1* | 2/2022 | Dundigalla | G06F 11/3684 |
| 2022/0138345 A1* | 5/2022 | Krishnan | G06N 20/00 |
| | | | 726/26 |
| 2022/0224711 A1* | 7/2022 | Singh | H04L 63/0236 |
| 2022/0400123 A1* | 12/2022 | Ayoub | G06F 3/067 |
| 2023/0162060 A1* | 5/2023 | Nickl | G06F 21/552 |
| | | | 707/694 |
| 2024/0250847 A1* | 7/2024 | Barry | H04L 12/4641 |

\* cited by examiner

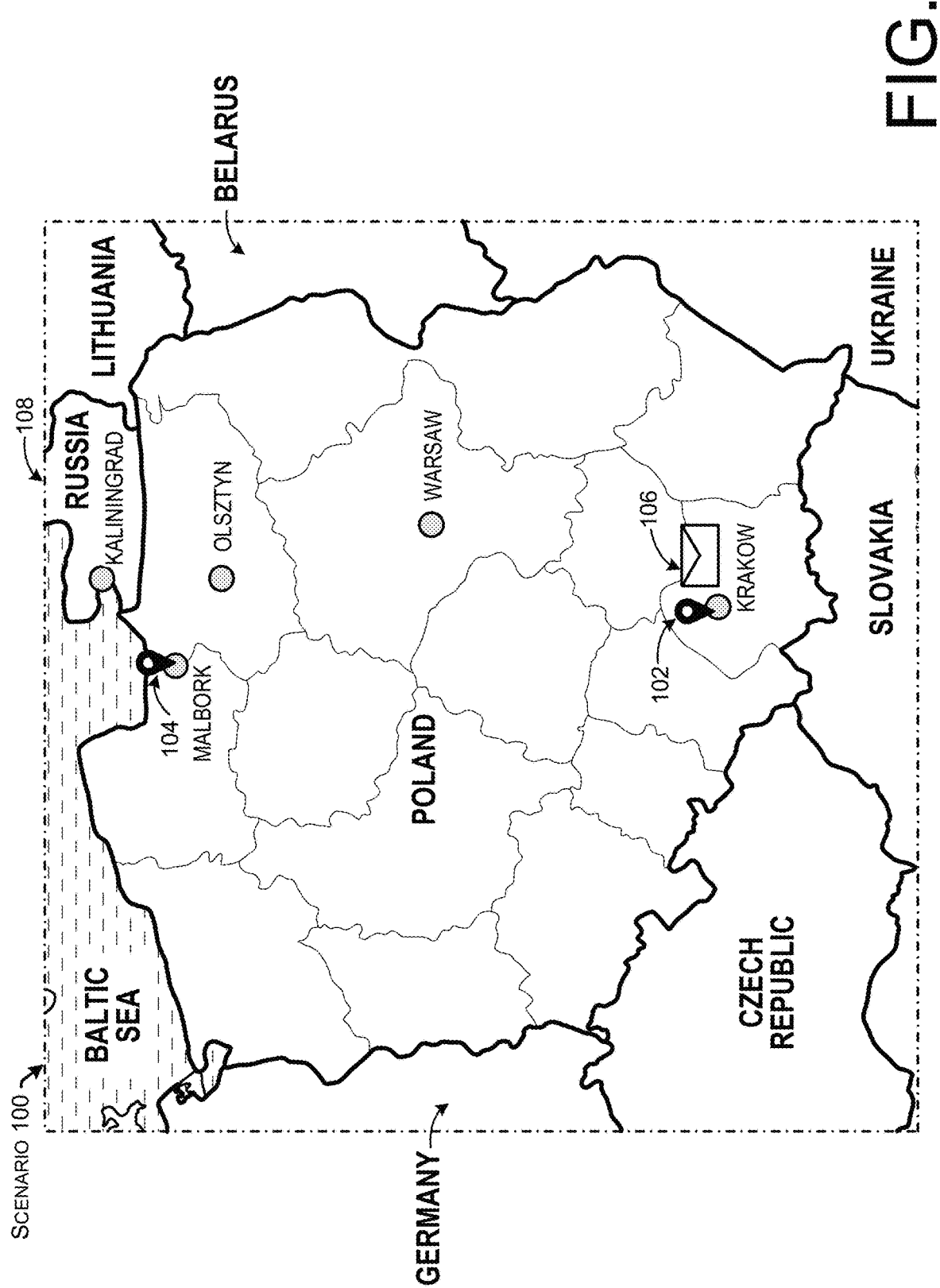

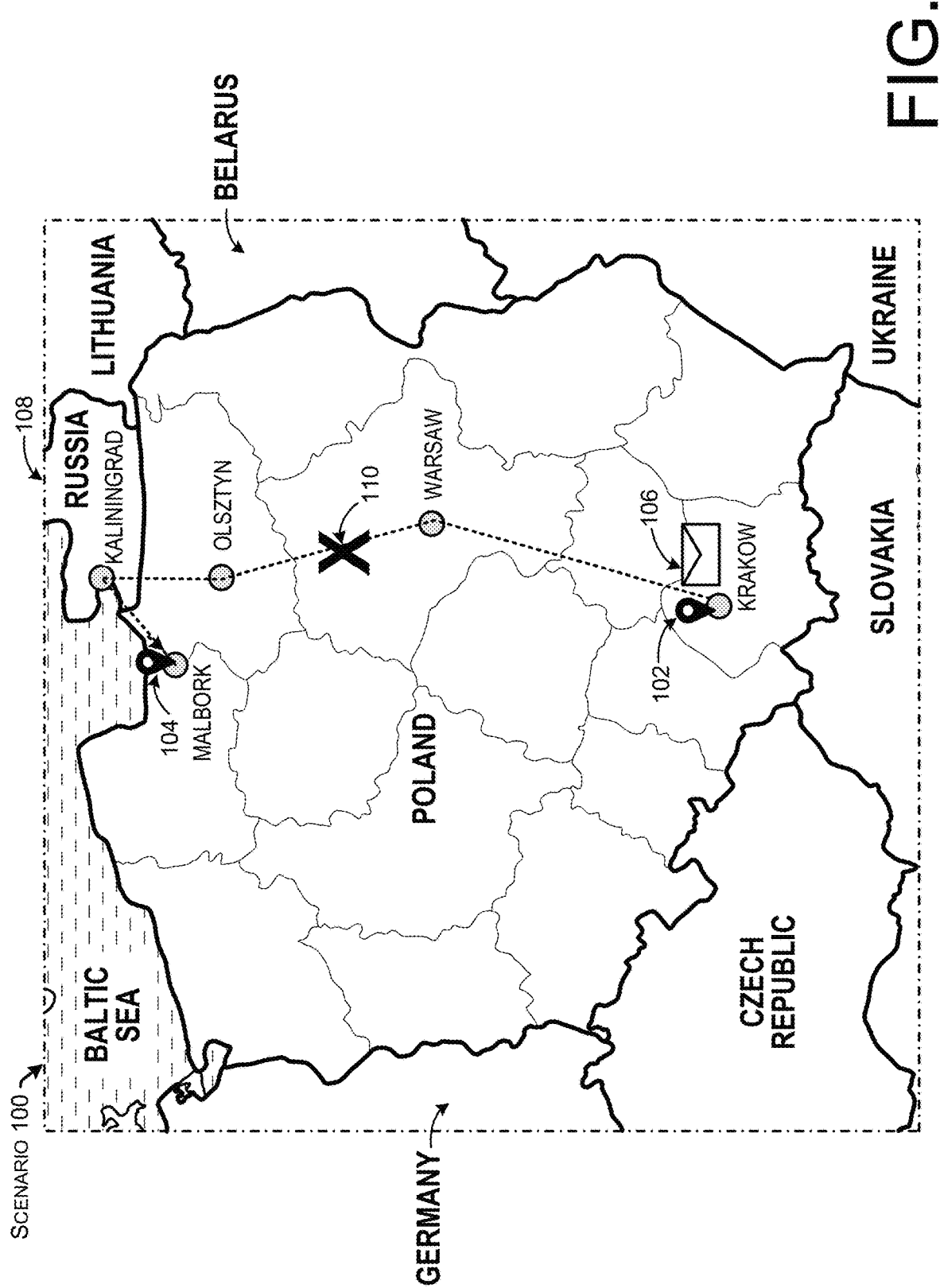

MONITORING AND VISIBILITY OF DATA TRAFFIC FLOWS

TECHNICAL FIELD

The present disclosure relates generally to monitoring and providing visibility on the movement and storage of data traffic flows among network devices, thereby ensuring policy compliance and security of sensitive data.

BACKGROUND

Many technology companies are moving to the use of a cloud-native, software as a service (SaaS) model. SaaS applications may utilize personally identifiable information (PII) data, such as for authentication purposes, for billing and payments, as health records, etc. Privacy and data protection are important issues for many entities around the world, such as individuals, organizations, and even countries. Different organizations and/or countries may have their own rules or laws related to PII data. The country may enact laws to try to regulate where PII data can be moved (or not), what counties the data can traverse, who has access to the data (e.g., citizenship), and what one can do with certain PII data. However, the movement of data outside the country may not be known. Furthermore, there is evidence of some entities (e.g., nation states) "redirecting" data traffic to their country or zone in order to capture data in transit. The movement of PII data is becoming a critical issue for many organizations and/or countries as they try to control both the movement of their sensitive data as well as where the data are stored.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 1A-1D includes a map view to illustrate an example scenario in which techniques for monitoring and visibility of data traffic flows may be employed as part of communications between network devices, in accordance with the present concepts.

DESCRIPTION OF EXAMPLE EMBODIMENTS

Overview

Figure 1B:
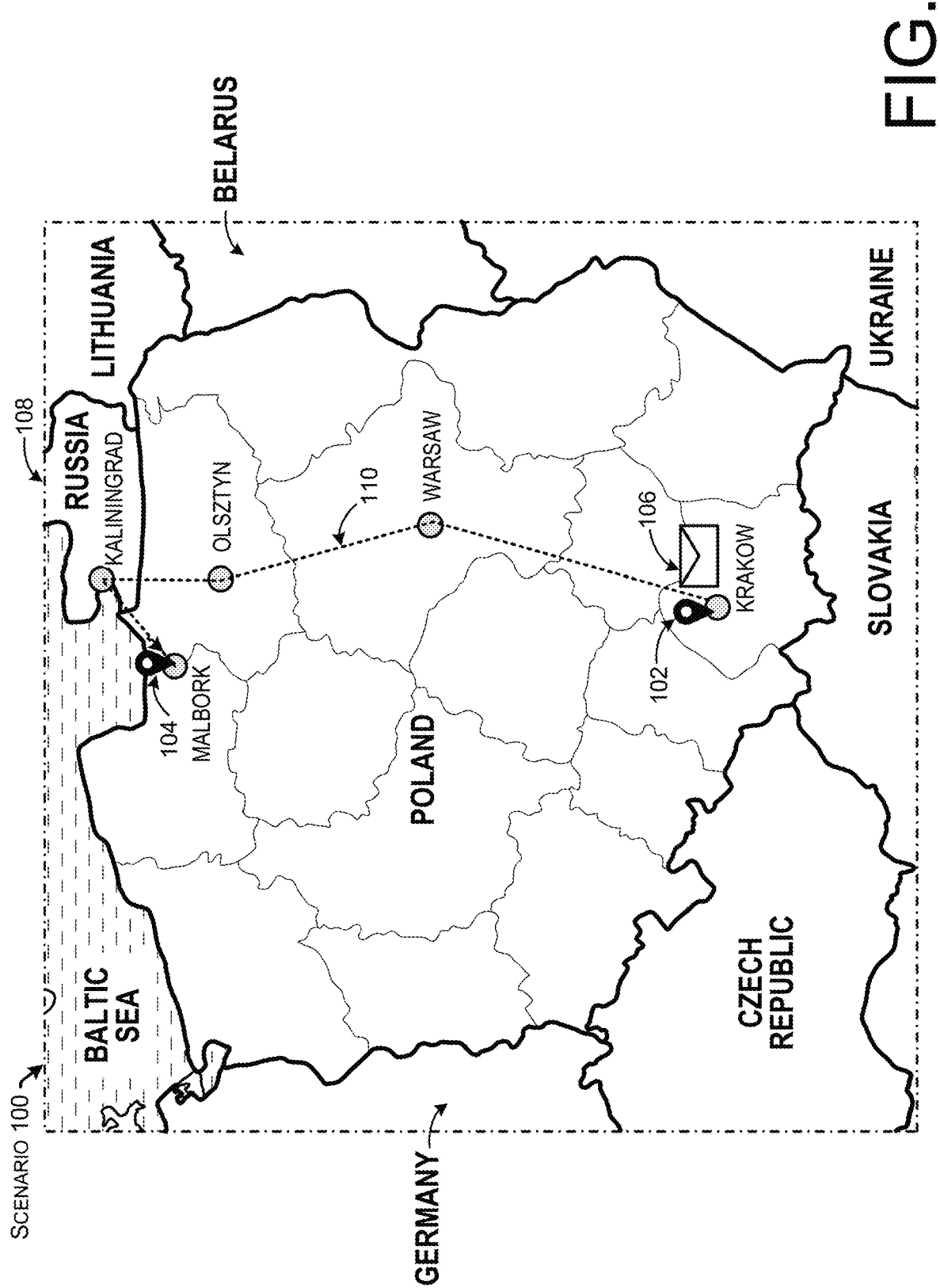

This disclosure describes, at least in part, a method that may be implemented by a client device communicatively coupled to various devices of a computing network. The method may include receiving an indication of a data traffic flow intended for delivery from a source endpoint to a destination endpoint. The method may also include determining that personally identifiable information (PII) is included in the data traffic flow intended for delivery to the destination endpoint. In some examples, the method may include sending a probe from the source endpoint to identify an intended data path of the data traffic flow to the destination endpoint. The method may further include generating a validation result. The validation result may be generated by validating the intended data path of the data traffic flow against a security policy related to data routing, for instance. Based at least in part on the validation result, the method may include performing an action regarding delivery of the data traffic flow, including the PII, via the intended data path.

This disclosure also describes, at least in part, a method that may be implemented by a client device communicatively coupled to various devices of a computing network. The method may include determining that personally identifiable information (PII) is included in a data traffic flow intended for delivery over a computing network to an application server. The method may also include generating a path probe to detect one or more midpoints of an intended data path of the data traffic flow. Based at least in part on sending the path probe into the computing network, the method may include receiving telemetry data. The telemetry data may include at least one detected midpoint of the intended data path, for instance. The method may also include performing a validation of the intended data path against a policy associated with the at least one detected midpoint. Based at least in part on the validation, the method may include preventing the data traffic flow from proceeding to the application server.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for monitoring and visibility of data traffic flows that may contain sensitive information, such as personally identifiable information (PII) data. For example, the techniques may include determining whether a scheduled data traffic flow includes PII data. Upon learning that a data traffic flow includes PII data, an intended path of the data traffic flow may be determined prior to the actual data being sent. The intended path may be examined to determine if the PII data are allowed to traverse all of the hops in the path to a destination server. For instance, any of the hops may lead to a country or other region or policy zone that is different than the source of the data traffic flow. The intended path may be validated for policy compliance. Consequently, action may be taken to allow or prevent the PII data from traveling the intended path based on whether the path complies with an associated policy.

Software as a service (SaaS) applications may be described as borderless, decentralized, and/or cloud-native models in which data traffic flows may move rapidly to servers in different jurisdictions to fulfill computing resource needs. This borderless architecture allows users to connect anywhere, from any device, to applications or resources virtually anywhere in the world in a secure and reliable manner. When a client is accessing such a resource, the communications involved in the access procedure may contain PII data. Attempts are being made by countries and organizations to put regulations on how PII data may be processed, including actions such as collecting, recording, storing, and/or transferring PII data.

However, currently, there is little visibility in where PII data are stored, and even less visibility in what path PII data may take to travel to a destination. For example, there may be little or no visibility into a path that a data traffic flow containing PII data might take while traversing the internet, such as from a client device to a location at which the SaaS application resides. Without path visibility, there is no way to know whether the path the PII data takes and/or the location at which the SaaS application resides is complying with government laws, mandates, or corporate policies regarding data privacy and protection. Furthermore, there are very little enforcement options available. Corporations are left to try to discover where their applications are hosted, and/or whether the applications store any PII data. Even if a corporation were able to determine these key items, the corporation would still be left to try to determine whether the all the hops along a data path were appropriate or not. Therefore, PII data may be moved to a location that is not secure, and such a breach of data security may only be detected after the data traffic flow has occurred. The present techniques are intended to prevent the movement of PII data to or through an unsecure location.

The disclosed techniques represent a proactive capability for preventing unauthorized storage or traversal of hops in a network, such as when a data flow contains PII data or other sensitive data. In some implementations, a lightweight endpoint agent at a client device may examine a SaaS application to detect a request for PII data. If the PII data request is detected, the endpoint agent may send a probe packet to identify an intended path that a PII data packet would traverse. Additionally, the endpoint agent may attempt to determine a type or category of the PII data. The endpoint agent may then take action with respect to the PII data packet based on associated organization and/or country policies. For example, in an instance where the intended path is found to be compliant for the specific type of PII data, the PII data packet may be sent out along the intended path. In an instance where the intended path is not compliant with a relevant policy for any reason, a variety of actions may be taken. The data traffic flow may be dropped, for instance. An alternative path for the PII data may be requested. In some examples, a notification of the issue may be sent to the end user (e.g., client), an IT administrator, and/or the SaaS provider as part of an auditing and/or reporting process. In some implementations, a centralized dashboard may provide tracking, logging, and/or path visualization of PII data using information collected by the endpoint agent. As such, the disclosed techniques include identification of a type of PII data, path probing and policy validation relative to the PII data, taking an action based on the policy validation, and finally auditing.

As used herein, PII data may include any of a variety of personal data or otherwise sensitive information. PII data may include any information that relates to an identifiable living individual. PII data may be regarded as sensitive information and/or not generally publicly available information. PII data may include a specific category of personal data, such as a name, email address, cellular phone number, tax identification (ID) number, etc. PII data may also include various other information such as a health record, biometric data, visual data, and/or audio data. It is to be understood that the present techniques may be applied regarding any of a variety of sensitive or private information, and the term PII is not mean to be limiting. For instance, a corporation may wish to protect sensitive product information or another type of industry secret from travelling the internet, a nation may wish to protect information belonging to its citizens or sensitive military information, etc. The present techniques may be applied to these scenarios and more.

To summarize, the present techniques include the ability to identify types of PII data, determine an intended path that PII data may take over the internet, and scrutinize the intended path with respect to PII policy zones to check for compliance with data protection requirements. Based on a determination of compliance for the type of PII data, action may then be taken before the PII data ever leave the client device. As such, the present techniques help enforce data privacy and protection laws, but also protect PII data from possible data exfiltration by nefarious nation state actors and/or other entities from uncontrolled PII policy zones.

Although the examples described herein may refer to an endpoint device and/or client device as the location of a monitoring agent (e.g., endpoint agent), the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1D collectively illustrate an example scenario 100 in accordance with the present data path monitoring and visibility concepts. FIGS. 1A-1D generally depict a map of Poland and portions of adjacent European countries, such as Russia, Czech Republic, etc. The map also includes some towns relevant to example scenario 100, such as Krakow, Warsaw, Olsztyn, and Malbork in Poland, and Kaliningrad in Russia. As shown in FIGS. 1A-1D, example scenario 100 may include a client device 102 (e.g., source endpoint) in Krakow and an application server 104 (e.g., destination endpoint) in Malbork. Further description of an example client device and/or application server will be provided below relative to FIG. 2.

Referring to FIG. 1A, in scenario 100, client device 102 may determine that PII data are intended to be sent out from client device 102 over the internet. For instance, PII data may be included in a PII data packet 106 intended for delivery over the internet to a SaaS application. In example scenario 100, the SaaS application may be hosted at application server 104, the destination endpoint. Note that Poland may be considered part of the European Union (EU) PII Zone. Russia may be considered as existing outside the EU PII Zone. Per EU PII data regulations, at least some types of data may be allowed to travel within the EU PII Zone, including to other EU countries, as opposed to travelling outside of the EU PII Zone. Thus, in example scenario 100, PII data packet 106 is intended for delivery from the source endpoint in Krakow to the destination endpoint in Malbork, which are both within the approved EU PII Zone, and more specifically both within the same country, Poland.

However, before the PII data packet 106 is sent out across the internet to application server 104, client device 102 (e.g., an endpoint agent on client device 102) may initiate various data path monitoring and/or visibility techniques to determine whether the PII data packet 106 should be allowed to depart client device 102. For instance, client device 102 may perform a path probing operation.

As depicted in FIG. 1B, client device 102 may find that PII data packet 106 is scheduled to be sent to application server 104 via intended data path 110. In this scenario, the route of intended data path 110 begins at the source endpoint in Krakow, passes through midpoints in Warsaw and Olsztyn, then departs Poland and arrives at another midpoint in Kaliningrad, Russia, before travelling back into Poland and arriving at the destination endpoint in Malbork. Once intended data path 110 is known, a determination may be made as to whether the PII data packet 106 should be allowed to depart client device 102. For example, a policy regarding PII data packet 106 may be accessed and intended data path 110 may be validated against the policy.

In example scenario 100, the policy and/or EU PII data regulations may indicate that PII data packet 106 is not supposed to leave Poland, not supposed to leave the EU PII Zone, not supposed to enter Russia, or all of the above. For instance, the PII data included in PII data packet 106 may be a type of data that is prevented from entering Russia per a particular policy. Therefore, intended data path 110 may fail a policy validation regarding the inclusion of PII data packet 106 in a data traffic flow that is expected to travel by intended data path 110. Thus, as indicated by the "X" in FIG. 1C, PII data packet 106 may be prevented from leaving client device 102 in Krakow via intended path 110, since the data traffic flow would violate the policies configured for the EU PII Zone. Note that a user of client device 102 and/or an administrator associated with scenario 100 may be notified of an action regarding PII data packet 106; examples of such notifications will be described below relative to FIG. 2.

Figure 1D:
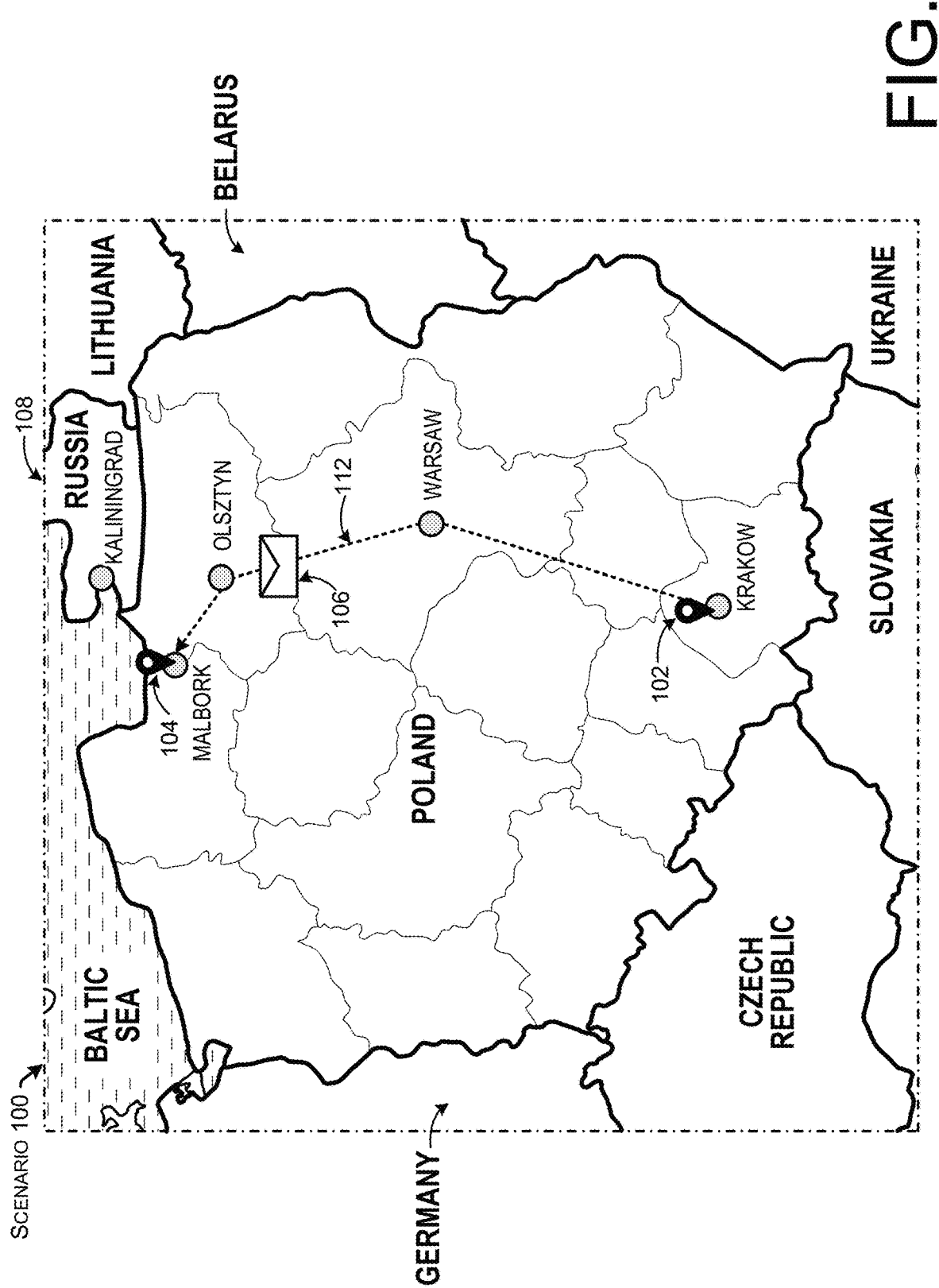

As shown in FIG. 1D, in another instance, a path probing operation may find a different data path for the intended data traffic flow. In this instance, data path 112 originates in Krakow, passes through Warsaw and Olsztyn, and arrives in Malbork. With data path 112, all hops of the route, from the source endpoint to the destination endpoint, stay within Poland and within the EU PII Zone. Therefore, in scenario 100, data path 112 would pass path validation scrutiny, and PII data packet 106 may be allowed to travel via data path 112 to application server 104 in Malbork.

Figure 2:
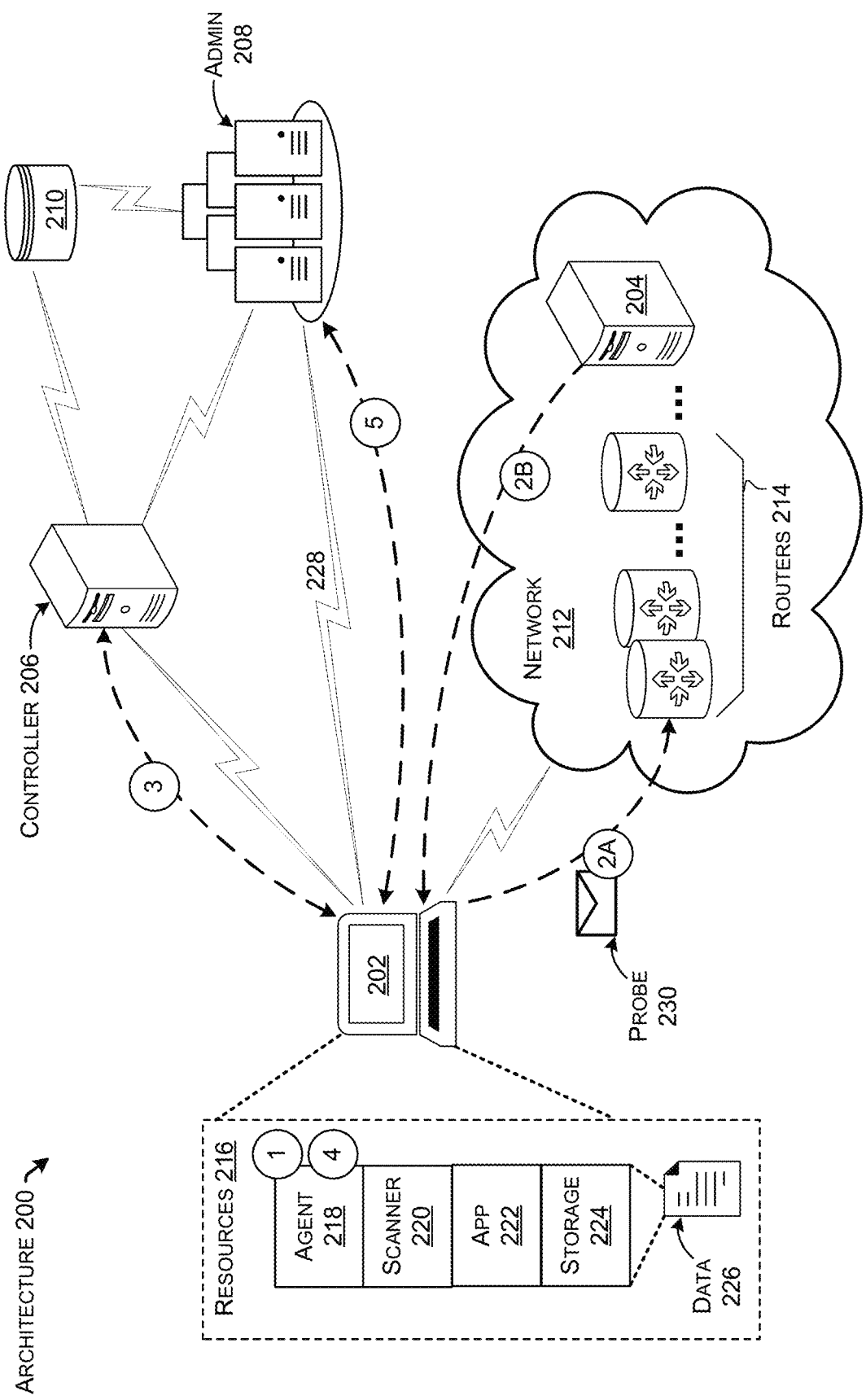
FIG. 2 illustrates a component diagram with an example architecture that may be utilized to perform techniques for monitoring and visibility of data traffic flows among network devices, in accordance with the present concepts.

FIG. 2 illustrates an example environment 200 in accordance with the present data path monitoring and visibility concepts. Some aspects of the examples shown in FIG. 2 may relate to aspects of the example scenario 100 described above relative to FIGS. 1A-1D. For instance, example environment 200 may include a client device 202, which may be similar to client device 102 (FIGS. 1A-1D). Example environment 200 may also include an application server 204, which may be similar to application server 104 (FIGS. 1A-1D). Example environment 200 may also include controller 206, administrator 208, database 210, network 212. Network 212 may include routers 214, as well as application server 204.

The client device 202 may comprise any type of device configured to communicate using various communication protocols (e.g., short range protocols, TCP/IP, User Datagram Protocol (UDP), tunneling protocols, and/or any other protocol) over various networks. For instance, the client devices 102 may comprise one or more of personal user devices (e.g., desktop computers, laptop computers, phones, tablets, wearable devices, entertainment devices such as televisions, etc.), network devices (e.g., servers, routers, switches, access points, etc.), and/or any other type of computing device. Also depicted in FIG. 2, client device 202 may include or be associated with various computing resources 216, such as endpoint agent 218, scanner 220, application 222 (e.g., SaaS application), and storage 224. Further, storage 224 may include data 226. Data 226 may be considered PII data in this example, and therefore may be subject to applicable policies regarding transfer away from client device 202.

The devices of environment 200 may be communicatively coupled to each other via one or more networks implemented by any viable communication technology, such as wired and/or wireless modalities and/or technologies. For example, within the environment 200, the client device 202, controller 206, administrator 208, devices associated with network 212, and/or other devices may exchange communications (e.g., packets) via a network connection(s), indicated by the lightning bolts 228 (only one lightning bolt is designated to avoid clutter on the drawing page). For instance, network connections 228 may be transport control protocol (TCP) network connections or any network connection (e.g., information-centric networking (ICN)) that enables the client device 202 to exchange packets with other devices. The network connections 228 represent, for example, data paths between the client device 202 and other devices. It should be appreciated that the term "network connection" may also be referred to as a "network path."

Note that client device 202, controller 206, administrator 208, and/or database 210 may be considered to be part of network 212, in some examples. The depiction of a cloud computing network for network 212 in this example is not meant to be limiting. Other types of networks are contemplated in accordance with data path monitoring and visibility concepts, including or connecting any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof.

FIG. 2 show several examples of communications and/or other actions that may be taken among the computing resources 216 of client device 202 and various other devices in environment 200. The actions are indicated by circled numbers and/or dashed lines. For example, at "Step 1," endpoint agent 218 may receive an indication that there is a request for data 226 to leave client device 202. For instance, a request associated with application 222 may be received at client device 202 for the data 226 to be sent to application server 204. The endpoint agent 218 may intercept and/or view the request by monitoring the application 222 on client device 202, for example. The endpoint agent 218 may learn of the request prior to any action being taken to initiate transfer of the data 226 from client device 202. Note that the indication of data traffic including data 226 may not necessarily refer to a request from one component to another.

In some implementations, endpoint agent 218 may use and/or integrate with scanner 220 to monitor application 222 for potential instances of data transfer away from client device 202. Scanner 220 may be a plug-in type scanner (e.g., browser or application based scanner) to examine an application running on client device 202. More specifically, in some cases, scanner 220 may be a PII scanner (e.g., Google InfoType detector, Amazon Macie, Tag Inspector, Atlan, etc.). Scanner 220 may be tasked to periodically or continuously monitor one or more applications on client device 202 for PII data, including application 222. Scanner 220 may perform a variety of operations to examine the data 226, https, and/or other information to identify whether the data 226 is PII. Scanner 220 may also attempt to classify a type of PII data involved (e.g., name, social security number, credit card data, IP address, etc.) in data 226 and/or in a particular portion of data 226 that is intended to be sent out from client device 202. Scanner 220 may notify endpoint agent 218 when an instance of intended transfer of PII data is detected. As a result, endpoint agent 218 may learn various information, which may include: application 222 intends to send all or some of data 226 away from client device 202, the intended recipient and/or final destination is application server 204, data 226 contain PII data, a type of the PII data contained in data 226, etc. In response, endpoint agent 218 may set a PII Data Flag in a packet of the intended data traffic flow to distinguish which packets contain PII data. Endpoint agent 218 may also flag one or more packets with additional information, such as the type of the PII data.

At "Step 2A," in some examples, upon learning that PII data may leave client device 202, endpoint agent 218 may send a probe packet 230 (e.g., synthetic probe, path probe) out to network 212. The purpose of probe packet 230 is to identify an intended data path the data 226 would traverse through the network to application server 204. (For a similar example, see intended data path 110 described relative to scenario 100 in FIG. 1B.) Referring again to FIG. 2, the probe packet 230 may be sent through a variety of devices associated with network 212. For instance, the probe packet 230 may be sent from client device 202 through one or more routers 214 (e.g., switches), through one or more other network devices, and eventually arrive at application server 204. Note that network 212 may be viewed as borderless (e.g., the world wide web), including devices located in various jurisdictions, countries, etc. As such, network 212 may contain devices in approved and unapproved regions with respect to PII data. As a result, probe packet 230 may be instrumental in detecting the intended data path of the data 226 across the network 212 en route to the application server 204.

At "Step 2B," in some examples, a notification of the intended data path (e.g., detected data path) may be sent from application server 204 back to client device 202. For instance, probe packet 230 may include instructions to send the notification of the intended data path and/or other information to the client device 202. Additional methods are contemplated for the endpoint agent to learn an intended, detected, expected, or otherwise potential path for data to be sent across network 212. For instance, rather than sending a probe packet, network modeling could be performed, requested, and/or accessed by endpoint agent 218 to learn of potential data paths for PII data.

At "Step 3," in some examples, endpoint agent 218 may send a variety of information to controller 218 to compare (e.g., check, validate) an intended data path against a policy. Endpoint agent 218 may send information regarding the intended data path learned from Steps 2A/2B to controller 206. Endpoint agent 218 may also send information regarding the PII data, such as a type of the PII data. In some examples, endpoint agent 218 may send flow metadata (e.g., IP address, username, hostname, server FQDN, etc.) received from scanner 220, detailed path information regarding each hop of the intended data path, a location of application server 204, etc. The information may be sent by endpoint agent 218 as part of or in conjunction with a validation request.

Controller 218 may validate the information associated with the intended data path against one or more policies. For example, the information may be compared and/or processed relative to a policy related to security, data transfer, data storage, PII, permitted PII zones, a type of PII data, country laws, corporate data privacy rules, geographic locations, etc. Controller 218 may access such policies at one or more databases, such as database 210 for instance. Database 210 may be a repository of information tended by controller 206, or may be a database available for access by other entities, such as a government site that provides information on data policies.

In some examples, the validation process may include controller 218 confirming whether an intended data path traverses approved or unapproved PII zones, or whether the PII data or type of PII data are permitted in each zone the intended data path traverses. An example of an effect of a data security or privacy policy is that certain data are not permitted to leave a particular country—not permitted to cross a legal border of the country. However, as suggested above, enforcement of such a policy is challenging due to the nature of hybrid cloud environments. As a result of the validation process, controller 206 may determine whether an intended data path is compliant, given the type of PII data or other associated information. Controller 206 may then send an indication of results of the validation process to endpoint agent 218. For instance, a validation result may simply indicate a passed validation or a failed validation. Controller 206 may also provide a "go" or "no-go" indication to endpoint agent 218 regarding the data traffic flow. Controller 206 may provide a variety of additional information or instruction regarding potential action for endpoint agent 218 to pursue, described below in Step 4.

At "Step 4," in some examples, endpoint agent 218 may take action based on information received from controller 206 after the policy compliance check. A variety of actions may be taken regarding any potential data traffic flow that is expected to include PII data with the intent of complying with applicable policies and/or laws. For example, an action may include dropping the data traffic flow or a particular data packet in an instance where controller 206 indicates that the intended data path did not pass the validation process. Another action may include allowing a validated data traffic flow to proceed. Endpoint agent 218 may notify an end user of client device 202 of an action taken, such as causing information about a dropped packet to be shown via a display of client device 202, in some cases. Endpoint agent 218 may notify a SaaS provider associated with application 222 of a validation result or action taken that affects a data traffic flow. Additional or alternative actions may include sending information to administrator 208, described below in Step 5.

At "Step 5," in some examples, endpoint agent may send information related to the data traffic flow and/or information received from controller 206 to administrator 208. For instance, administrator 208 may represent a centralized dashboard that allows an IT administrator of a corporation to interact with endpoint agent 218. In some examples, administrator 208 may provide a cloud-based dashboard that enables visualization of data traffic flows, PII data movement in particular, configuration of policies, and/or overview of actions regarding PII. Endpoint agent 218 may send a wide variety of reporting and/or audit information to the dashboard along with any data traffic flow and path information that might help enable visual representation. In some implementations, endpoint agent 218 may send telemetry information to the visualization dashboard at administrator 208 such that administrator 208 is enabled to produce a display related to the data traffic flow. Endpoint agent 218 may specifically notify an IT administrator of a validation result or effect on a data traffic flow.

In some examples, administrator 208 may use information received from endpoint agent 218 in a variety of ways to help manage network operations. In one example, administrator 208 may be able to provide input to various stages of data path monitoring and visibility techniques, in addition to compiling results of path validation processes. For instance, administrator 208 may be able to send instruction to endpoint agent 218 (or scanner 220) regarding the deployment of scanner 220. In another example, administrator 208 may be able to investigate a cause of a path diverging from an expected and/or intended path for a particular data traffic flow. For instance, where a data traffic flow diverges from an approved path to an unapproved path or hop (according to a relevant policy), administrator 218 may be able to investigate the scenario for signs of a malicious attempt to redirect the traffic outside of the approved zone. Administrator 218 may then be able to take further action, such as providing a notification regarding detected potential malicious activity, sending instructions to endpoint agent 218 to further protect the PII data, etc.

Note that not all applications on a client device such as 202 are expected to transfer PII data, therefore administrator 208 may have flexibility to select which applications to monitor with respect to PII data, for instance. Stated another way, administrator 208 may represent a compliance audit dashboard, a tool that an IT administrator uses to configure enterprise security policies for a corporation regarding how to handle PII data. The dashboard may provide visual representation of PII data flows, application information, client information, PII data types, etc. The dashboard may also be enabled to share a variety of information with other security and/or audit tools, such as communicating with database 210 or other devices or entities. As such, the present data path monitoring and visibility concepts may be viewed as providing such features as full stack observability for PII data, visibility and control of a PII data path (potentially globally), an added layer of security on data sovereignty, etc.

Figure 3A:
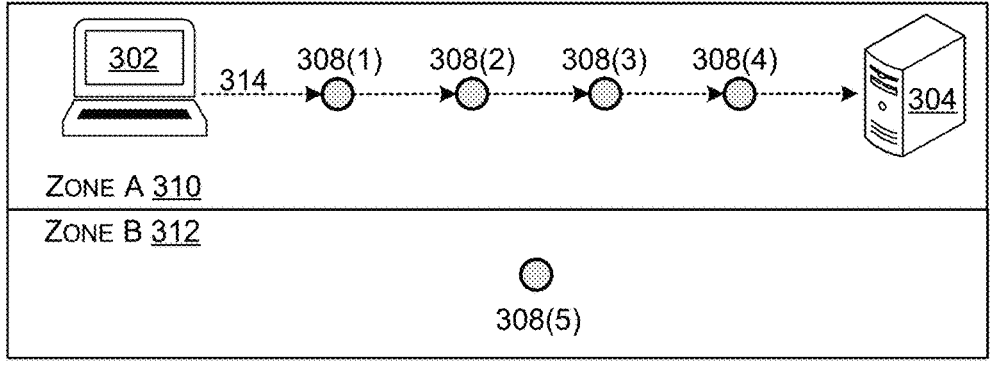
FIGS. 3A-3C include component diagrams that illustrate an example scenario in which techniques for monitoring and visibility of data traffic flows may be employed as part of communications between network devices, in accordance with the present concepts.
Figure 3B:
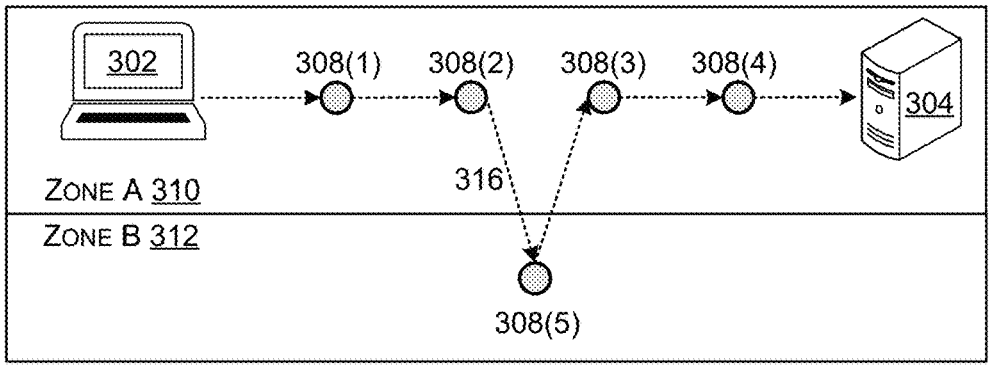
Figure 3C:
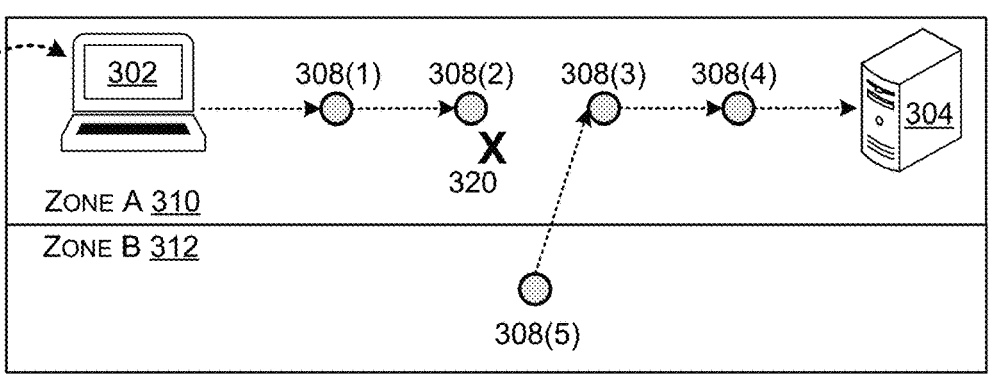

FIGS. 3A-3C collectively illustrate an additional example scenario 300 in accordance with the present data path monitoring and visibility concepts. Some aspects of the examples shown in FIGS. 3A-3C may be similar to aspects of the examples described above relative to FIGS. 1A-2. Therefore, for sake of brevity, not all elements of FIGS. 3A-3C will be described in detail. Example scenario 300 may include a client device 302, an application server 304, a controller 306, and various network devices 308. In FIGS. 3A-3C, parentheticals are utilized after a reference number to distinguish like elements. Use of the reference number without the associated parenthetical is generic to the element. For instance, the network devices include network device 308(1), network device 308(2), etc. FIGS. 3A-3C also depicts Zone A 310, which includes client device 302, an application server 304, and many of the network devices 308, and Zone B 312, in which only network device 308(5) is shown.

Referring to FIG. 3A, in scenario 300, a regular data traffic flow indicated by arrows at 314 begins at client device 302 and travels through network devices 308(1), 308(2), 308(3), and 308(4) to arrive at application server 304. As such, data traffic flow 314 is contained within Zone A 310. In scenario 300, Zone A 310 may be viewed as an "approved" region with respect to data privacy and protection regulations. Therefore data traffic flow 314 may be considered validated against applicable PII data policies, and PII data may be included in the data traffic flow 314 in the course of accessing an SaaS application at application server 304, for instance.

Referring to FIG. 3B, in scenario 300, a change may have occurred at some time subsequent to the instance shown in FIG. 3A. For example, prior to sending a particular packet of PII data, client server 302 may re-validate the potential packet path. During the re-validation, the client server 302 may find that the expected route has changed to new intended path 316. For instance, route changes may have occurred for a variety of reasons, producing a different path which now includes a router hop to network device 308(5) in Zone B 312. Unfortunately, Zone B 312 is a restricted region in scenario 300, and does not comply with a relevant PII data policy.

Referring to FIG. 3C, in scenario 300, controller 306 may determine that the intended route 316 is not compliant, and inform client device 302 to take action based on the configured policies. For example, controller 306 may have received information regarding intended route 316 from client device 302. At suggested at 318, controller 306 reply to client device 302 with instructions to drop the PII data packet. In some implementations, controller 306 may send a block rule to prevent PII data from travelling out of Zone A 310, as suggested with the "X" at 320, for instance. The client device 302 may also be instructed to notify an end user of the action to drop the PII data packet, notify the SaaS of the action, notify an IT administrator of the action, and/or send some other notification. Additionally or alternatively, controller 306 may take action to investigate the occurrence, such as looking for signs of potential malicious activity and/or outright attempts to redirect the PII data.

To summarize, the data path monitoring and visibility techniques described herein may improve data security and/or network performance. Through the present techniques, data security may be improved by preventing a potential data disclosure into an unapproved region. Furthermore, the techniques may help prevent possible data exfiltration and/or other theft of sensitive data and information. Such proactive data security measures can help ensure compliance with the policies of various countries, organizations, and/or other entities. Additionally, the techniques are relatively lightweight, featuring low computational cost and/or low bandwidth usage.

Figure 4:
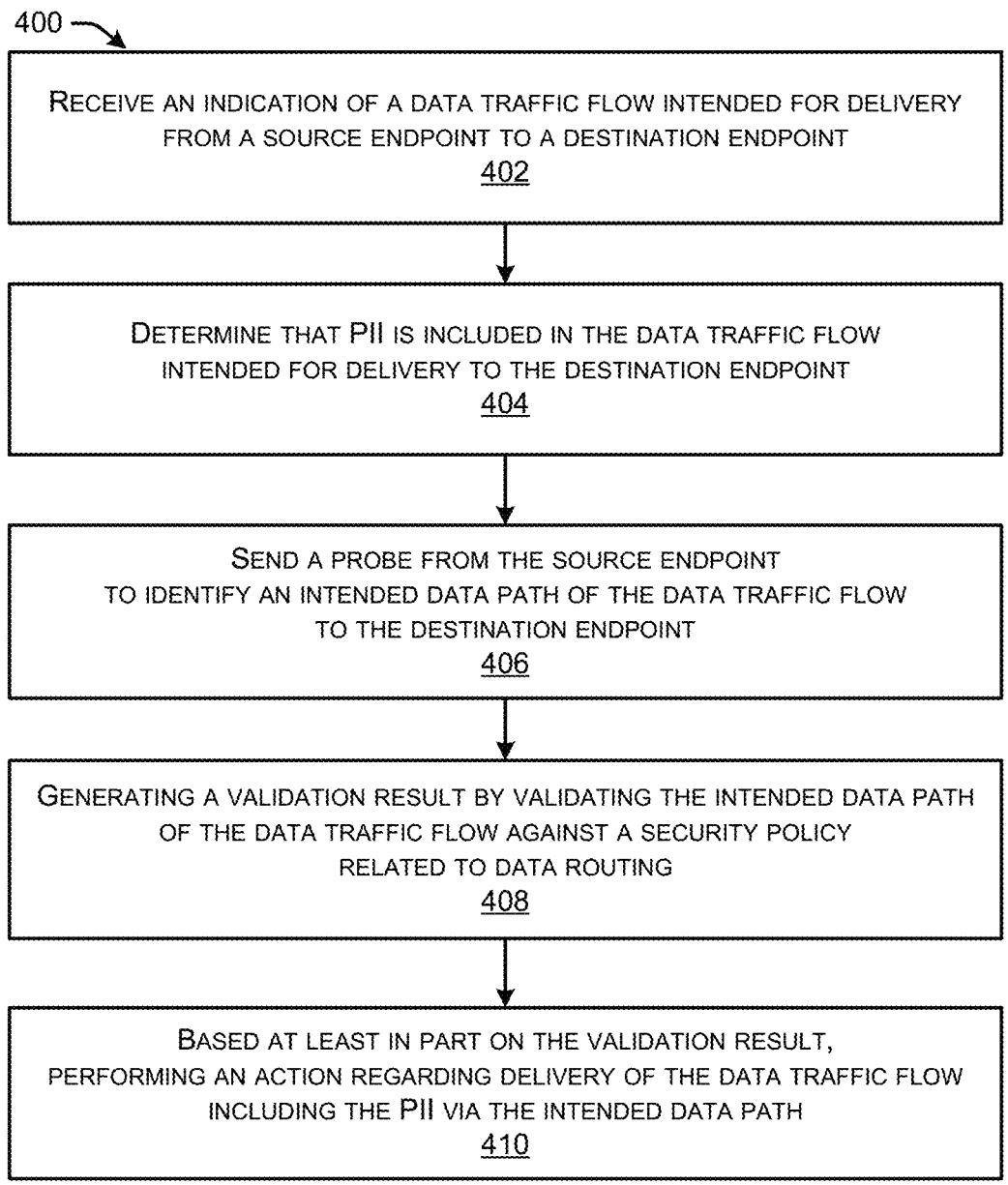
FIGS. 4 and 5 illustrate flow diagrams of example methods for monitoring and visibility of data traffic flows as a part of communications among network devices, in accordance with the present concepts.
Figure 5:
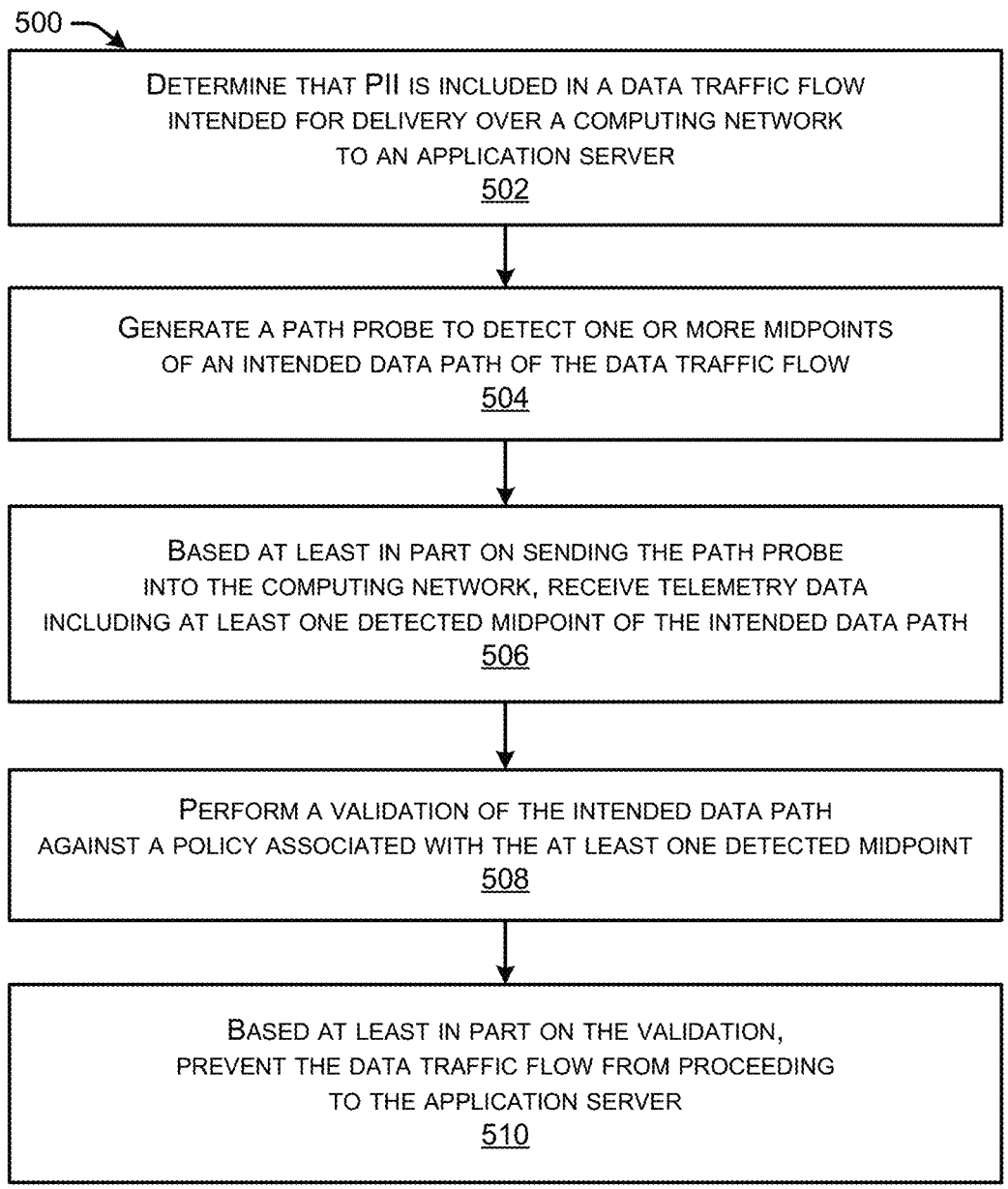

FIGS. 4 and 5 illustrate flow diagrams of example methods 400 and 500 that include functions that may be performed at least partly by a computing device, such as client devices 102, 202, and 302, controller 206 and 306, or other devices described relative to FIGS. 1A-3C. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4 and 5 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 4 illustrates a flow diagram of an example method 400 for a computing device to perform data path monitoring and visibility techniques. Method 400 may be performed by a client device (e.g., client devices 102, 202, and 302) communicatively coupled to a controller (e.g., controller 206), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving an indication of a data traffic flow intended for delivery from a source endpoint to a destination endpoint. For example, an endpoint agent operating on the client device may receive the indication of the data traffic flow from another component of the client device, such as from a scanner.

At 404, method 400 may include determining that personally identifiable information (PII) is included in the data traffic flow that is intended for delivery to the destination endpoint. As suggested above, the indication of the data traffic flow may be received from a scanner that is configured to detect PII, therefore determining that the PII are included in the data traffic flow may simply refer to learning of the PII from the scanner component, in some scenarios.

At 406, method 400 may include sending a probe from the source endpoint. The probe may be sent to identify an intended data path of the data traffic flow to the destination endpoint, for instance. In some examples, method 400 may further include design and/or generation of the probe for the purpose of path detection.

At 408, method 400 may include generating a validation result. In some examples, the validation result may be generated by validating the intended data path of the data traffic flow against a security policy. The security policy may be related to data routing, for instance. Further, the security policy may be related to at least one geographic region associated with at least one midpoint of the intended data path. In some scenarios, the midpoint of the intended data path may be noncompliant with the security policy. In such a case, the validation result is a failed validation. For instance, the midpoint may be located in a geographic region to which the security policy prohibits PII or other data transfer. In some examples, generating the validation result may be accomplished by sending the intended data path to a controller for validation against the security policy. Therefore, the validation result may be received from the controller. Further, an instruction indicating an action regarding delivery of the data traffic flow may also be received from the controller. For instance, the controller may deliver an instruction to allow or prevent the data traffic flow, or to otherwise drop the data traffic flow, etc.

At 410, based at least in part on the validation result, method 400 may include performing an action regarding delivery of the data traffic flow that includes the PII via the intended data path. For example, the validation result may indicate that the intended data path is noncompliant with the security policy, and the resultant action may comprise dropping the data traffic flow.

In some examples, method 400 may further include sending a report or other information to another device, such as an administrator. For instance, a report that includes the validation result or information about the action regarding delivery of the data traffic flow may be sent to an administrator. The report may also include telemetry or other data related to the intended data path.

FIG. 5 illustrates a flow diagram of an example method 500 for a computing device to perform data path monitoring and visibility techniques. Method 500 may be performed by a client device (e.g., client devices 102, 202, and 302) communicatively coupled to a controller (e.g., controller 206), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 400 may include determining that personally identifiable information (PII) is included in a data traffic flow. The data traffic flow may be intended for delivery over a computing network to an application server, for instance, but has not yet been sent.

At 502, method 400 may include generating a path probe (e.g., probe packet) to detect an intended data path of the data traffic flow. For example, detect the intended data path may comprise detecting potentially all of the midpoints of an intended data path.

At 502, based at least in part on sending the path probe into the computing network, method 400 may include receiving telemetry data. The telemetry data may include at least one detected midpoint of the intended data path, for instance.

At 502, method 400 may include performing a validation of the intended data path against a policy. In some examples, the policy may be associated with the at least one detected midpoint. Further, the policy may comprise a security policy related to transfer of PII to a geographic region of the at least one detected midpoint.

At 502, based at least in part on the validation, method 400 may include preventing the data traffic flow from proceeding to the application server. In some examples, method 400 may further include sending the telemetry data and/or an indication of the validation to an administrator. The telemetry data may be used to create a display for an IT administrator of a corporation, for instance. Method 400 may also include causing an indication of the validation to be displayed to a user, such as an end user of a client device.

Figure 6:
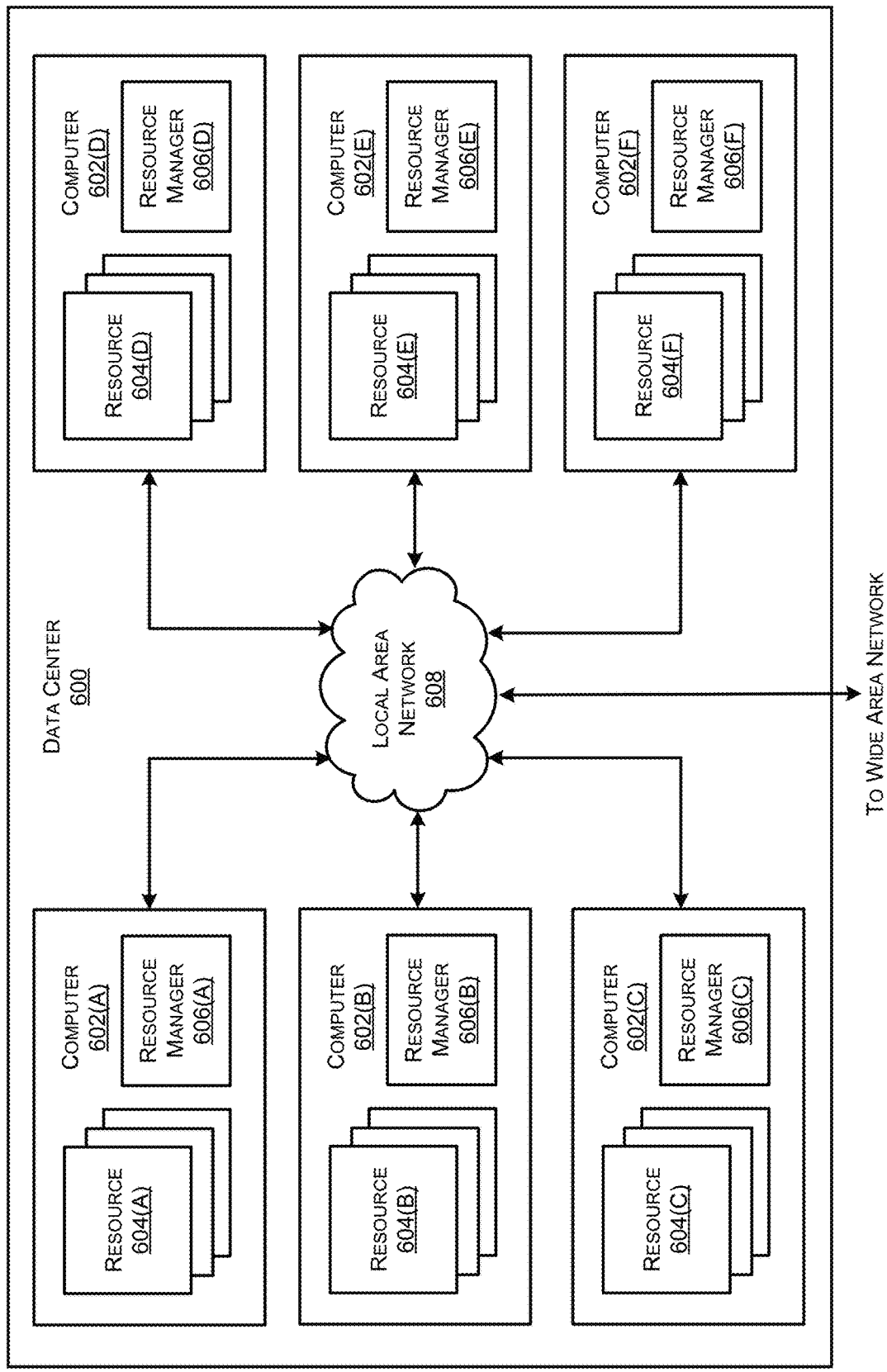
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as application server 204, or 304. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 212.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations.

Figure 7:
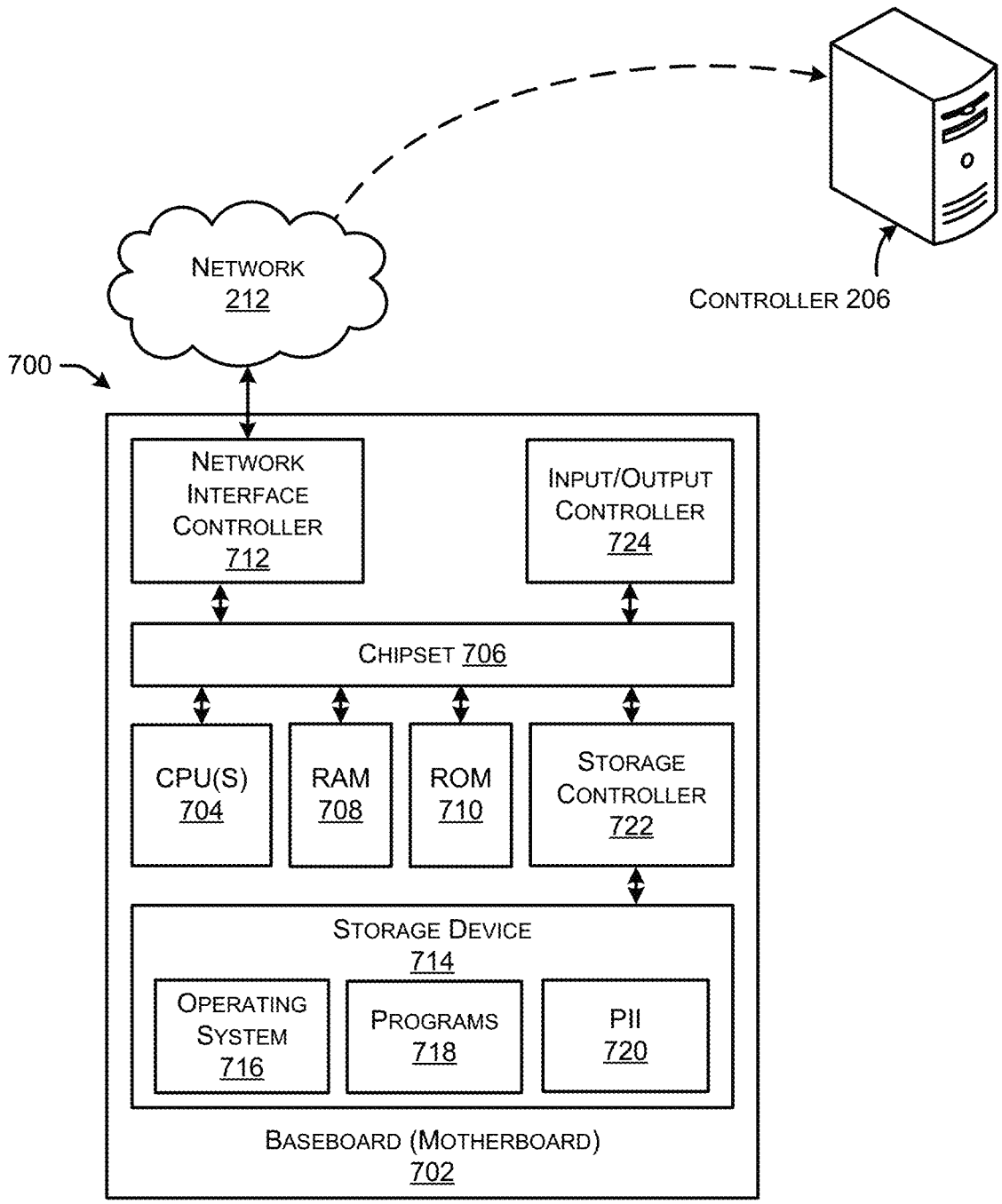
FIG. 7 is a computer architecture diagram showing an illustrative computer hardware architecture for implementing a device that can be utilized to implement aspects of the various technologies presented herein.

FIG. 7 shows an example architecture of a computer 700 capable of executing program components for implementing the functionality described above. The computer 700 shown in FIG. 7 illustrates a conventional computing device, workstation, desktop computer, laptop, tablet, network appliance, e-reader, smartphone, and/or other computing device, and can be utilized to execute any of the software components presented herein. The computer 700 may, in some examples, correspond to a physical device described herein, and may comprise networked devices such as servers, switches, routers, hubs, bridges, gateways, modems, repeaters, access points, hosts, etc. For instance, computer 700 may correspond to client device 202 or 302, controller 206, administrator 208, etc.

As shown in FIG. 7, the computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, which may include registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 212 or 608. The chipset 706 can include functionality for providing network connectivity through a network interface controller (NIC) 712, such as a gigabit Ethernet adapter. The NIC 712 is capable of connecting the computer 700 to other computing devices over the network 212. For instance, in the example shown in FIG. 7, NIC 712 may help facilitate transfer of data, packets, probe packets, and/or communications, such as a validation request, over the network 212 with controller 206 or administrator 208, etc. It should be appreciated that multiple NICs 712 can be present in the computer 700, connecting the computer to other types of networks and remote computer systems.

The computer 700 can be connected to a storage device 714 that provides non-volatile storage for the computer. The storage device 714 can store an operating system 716, programs 718, PII 720, telemetry, validation results, and/or other data. The storage device 714 can be connected to the computer 700 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 700 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 714 by detecting the physical states or characteristics of one or more particular locations within the physical storage units.

In addition to the mass storage device 714 described above, the computer 700 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 700. In some examples, the operations performed by the network 212, and/or any components included therein, may be supported by one or more devices similar to computer 700. Stated otherwise, some or all of the operations performed by the network 212, and or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 714 can store other system or application programs and data utilized by the computer 700.

In one embodiment, the storage device 714 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regards to FIGS. 1A-5. The computer 700 can also include computer-readable storage media having instructions stored thereupon for performing any of the other computer-implemented operations described herein.

The computer 700 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more devices, such as client device 202 or 302, controller 206, administrator 208, and/or other devices. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by client device 202 or 302, controller 206, administrator 208, and/or other devices. In some examples, the communications may include data, PII data, packet, path probe, request, validation result, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with data path monitoring and visibility techniques. For instance, the programs 718 may cause the computer 700 to perform techniques for communicating with other devices using any type of protocol or standard usable for determining connectivity. Additionally, the programs 718 may comprise instructions that cause the computer 700 to perform the specific techniques for monitoring and/or visibility of data traffic flows.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   receiving an indication of a data traffic flow intended for delivery from a source endpoint to a destination endpoint;
   determining that personally identifiable information (PII) is included in the data traffic flow intended for delivery to the destination endpoint;
   determining a PII data type of the PII in a packet of the data traffic flow;
   setting a PII data flag in the packet, the PII data flag including the PII data type;
   sending a probe to identify an intended data path of the data traffic flow to the destination endpoint;
   accessing a security policy related to data routing of the PII data type;
   generating a validation result by validating whether the intended data path of the data traffic flow is permitted for the PII data type according to the security policy; and
   based at least in part on the validation result, performing an action regarding delivery of the packet with the PII data flag via the intended data path.

2. The computer-implemented method of claim 1, wherein the security policy is related to at least one geographic region associated with at least one midpoint of the intended data path.

3. The computer-implemented method of claim 1, wherein the PII data type included in the PII data flag comprises:
   name;
   cellular phone number;
   tax identification number;
   credit card data;
   biometric data; or
   health record.

4. The computer-implemented method of claim 1, wherein the validation result indicates that the intended data path is noncompliant with the security policy, and further wherein the action comprises dropping the data traffic flow.

5. The computer-implemented method of claim 4, wherein the intended data path is noncompliant due to the PII data type.

6. The computer-implemented method of claim 5, further comprising:
   in a second instance, determining that the PII data type is compliant with a second intended data path; and
   based at least in part on the PII data type being compliant with the second intended data path, delivering a second packet containing the PII via the second intended data path.

7. The computer-implemented method of claim 1, further comprising:
   sending, to an administrator, a report of the action regarding delivery of the data traffic flow including the PII via the intended data path.

8. The computer-implemented method of claim 7, wherein the report includes telemetry data related to the intended data path.

9. A computing device comprising:
   one or more processors; and
   one or more non-transitory computer-readable media storing computer-executable instructions that, when executed by the one or more processors, cause the one or more processors to:
   receive an indication of a data traffic flow intended for delivery from a source endpoint to a destination endpoint;
   determine that personally identifiable information (PII) is included in the data traffic flow intended for delivery to the destination endpoint;
   determine a PII data type of the PII in a packet of the data traffic flow;
   set a PII data flag in the packet, the PII data flag including the PII data type;
   send a probe to identify an intended data path of the data traffic flow to the destination endpoint;
   access a security policy related to data routing of the PII data type;

generate a validation result by validating whether the intended data path of the data traffic flow is permitted for the PII data type according to the security policy; and based at least in part on the validation result, perform an action regarding delivery of the data traffic flow including the PII via the intended data path.

10. The computing device of claim 9, wherein the security policy is related to at least one geographic region associated with at least one midpoint of the intended data path.

11. The computing device of claim 9, wherein the PII data type included in the PII data flag comprises:
name;
cellular phone number;
tax identification number;
credit card data;
biometric data; or
health record.

12. The computing device of claim 9, wherein the validation result indicates that the intended data path is noncompliant with the security policy, and further wherein the action comprises dropping the data traffic flow.

13. The computing device of claim 12, wherein the intended data path is noncompliant due to the PII data type.

14. The computing device of claim 13, wherein the computer-executable instructions further cause the one or more processors to:
in a second instance, determine that the PII data type is compliant with a second intended data path; and
based at least in part on the PII data type being compliant with the second intended data path, deliver the data traffic flow via the second intended data path.

15. The computing device of claim 9, wherein the computer-executable instructions further cause the one or more processors to:
send to an administrator, a report of the action regarding delivery of the data traffic flow including the PII via the intended data path.

16. The computing device of claim 15, wherein the report includes telemetry data related to the intended data path.

17. A method comprising:
determining that personally identifiable information (PII) is included in a data traffic flow intended for delivery over a computing network to an application server;
determining a PII data type of the PII;
generating a path probe to detect one or more midpoints of an intended data path of the data traffic flow;
based at least in part on sending the path probe into the computing network, receiving telemetry data including at least one detected midpoint of the intended data path;
accessing a policy for the PII data type;
performing a validation by determining whether the policy permits the PII data type to traverse the intended data path including the at least one detected midpoint;
in an instance where the policy does not permit the PII data type at the at least one detected midpoint, preventing the data traffic flow from proceeding to the application server; and
in a second instance where the policy does permit a second PII data type of second PII in a second packet of the data traffic flow at the at least one detected midpoint, causing the data traffic flow to proceed to the application server via the intended data path.

18. The method of claim 17, wherein the policy comprises a security policy related to transfer of the PII data type to a geographic region of the at least one detected midpoint.

19. The method of claim 18, further comprising:
sending the telemetry data and an indication of the validation to an administrator.

20. The method of claim 17, further comprising:
causing an indication of the validation to be displayed to an end user.

* * * * *